Sept. 26, 1933.    L. E. LA BRIE    1,928,060

BRAKE

Filed Oct. 6, 1928

INVENTOR.
LUDGER E. LA BRIE
BY
ATTORNEY

Patented Sept. 26, 1933

1,928,060

UNITED STATES PATENT OFFICE 1,928,060

BRAKE

Ludger E. La Brie, South Bend, Ind., assignor to Bendix Brake Company, South Bend, Ind., a corporation of Illinois Application October 6, 1928. Serial No. 310,834

9 Claims. (Cl. 188—78)

This invention relates to brakes, and is illustrated as embodied in an internal expanding brake for an automobile. An object of the invention is to provide a simple but powerful brake of this general type.

One feature of the invention relates to arranging the return spring of the brake to act on means such as a thrust link forming part of the brake anchorage. Preferably the link extends through an apertured anchor member, and the spring is sleeved on the link and compressed between the anchor member and a stop on the link. This novel type of anchorage is especially advantageous in a brake having two such anchors arranged on opposite sides of the drum, and transmitting the braking torque to one of the anchors when the drum is turning in one direction and to the other when the drum is turning in the opposite direction.

The above and other objects and features of the invention, including various novel and desirable details of construction, will be apparent from the following description of one illustrative embodiment shown in the accompanying drawing, in which.

Figure 1:
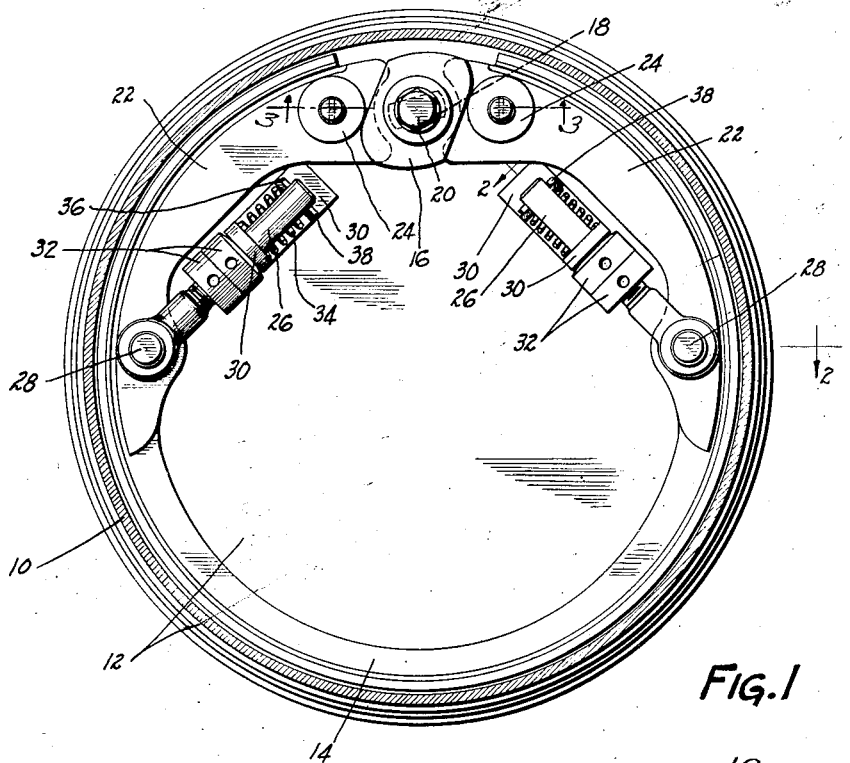
Figure 1 is a vertical section through the brake, just inside the head of the brake drum.
Figures 2, 3:
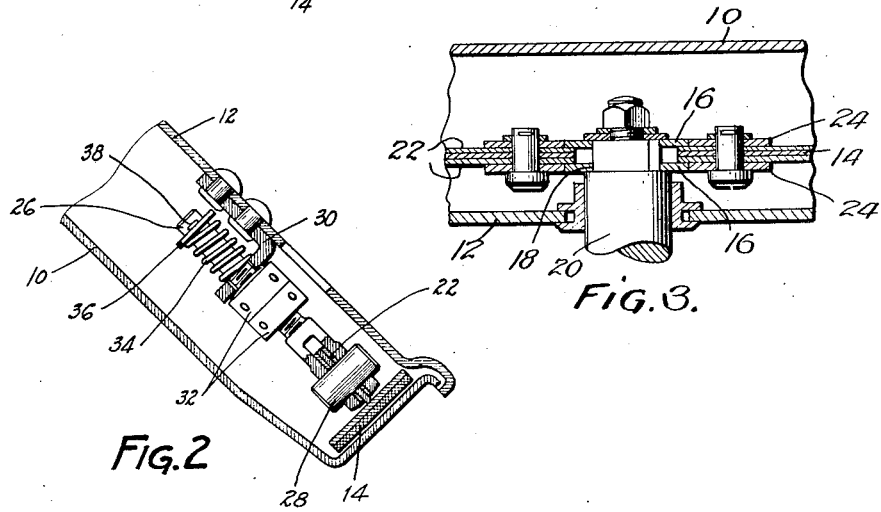
Figure 2 is a partial section through the brake, on the line 2—2 of Figure 1, showing the novel brake anchorage.
Figure 3 is a section taken on the line 3—3 of Figure 1 indicating the cam structure in detail.

The illustrated brake includes a rotatable drum 10, at the open side of which is a support such as a backing plate 12, and within which is the friction means of the brake, shown as an expansible floating friction band 14. The band may be applied by means such as floating cams 16 having transverse slots 18 slidably embracing a flattened portion of a camshaft 20. Cams 16 embrace the ends of the web of band 14, shown reinforced by welding plates 22 to its opposite sides, the cams being in operative engagement edgewise with thrust rollers 24 mounted on said ends.

At opposite sides of the drum, and inclined at approximately 45° to the vertical, are arranged thrust links 26 forked to straddle the web of band 14 and connected thereto by means such as pivots 28. Each link 26 extends through an aperture in an L-shaped stamped steel anchor member 30 riveted or otherwise secured to the brake backing plate.

Each link 26 is provided with a stop, shown as including two lock-nuts 32 threaded on the link, held in anchoring engagement with members 30 by a novel return spring 34 sleeved on the link and compressed between the anchor member 30 and a stop such as a washer 36 held on the end of the link by a cotter pin or the like 38.

In operation, actuation of the cam structure serves to spread the band 14 apart against the resistance of the springs 34, into drum engagement. Depending upon the direction of drum rotation, the band will then be wiped around, due to its frictional contact with the revolving drum, and anchor on one or the other of the anchoring members 30 through the intermediary of the thrust links 26. It is to be noted that during this action one or the other of said springs 34, already under compression, is further compressed and, upon release of the brake from drum contact, said spring functions to expand, returning the band friction device to its inoperative position clear of the drum. The normal wear of the band during its braking life may be compensated for to maintain a constant drum clearance by means of the adjustable lock nuts 32 threaded on links 26 and engaging the anchor member 30.

While one illustrative embodiment has been described in detail, it is not my intention to limit the scope of the invention to that particular embodiment, or otherwise than by the terms of the appended claims.

I claim:

1. A brake comprising, in combination, a floating friction device, a double anchorage including two anchor assemblies at least one of which includes a fixed anchor member adjacent said device, at least one thrust link pivoted to said device and extending through said member, and a return spring engaging said link and urging it into anchoring engagement with said member.

2. A brake comprising, in combination, a floating friction device, a double anchorage including two anchor assemblies at least one of which includes a fixed anchor member adjacent said device, at least one thrust link pivoted to said device and extending through said member, and a coil return spring sleeved on said link and urging it into anchoring engagement with said member.

3. A brake comprising, in combination, a floating friction device, apertured anchor members adjacent opposite sides of said device, thrust links pivoted to said device and extending respectively through and anchoring on said members, and a return spring engaging each of said links and urging it into anchoring engagement with the corresponding member.

4. A brake comprising, in combination, a floating friction device, apertured anchor members adjacent opposite sides of said device, thrust links pivoted to said device and extending respectively through said members, and a coil return spring sleeved on each of said links and urging it into anchoring engagement with the corresponding member.

5. Brake anchoring means comprising, in combination, a fixed L-shaped anchor member having one arm adapted to be fixedly secured to a backing plate and having the other arm provided with an aperture, a thrust link extending through said aperture and having an adjustable nut mounted thereon and in thrust engagement with said member, a stop on the end of said link on the side of the anchor member opposite said nut, and a coil spring sleeved on said link and compressed between the stop and the anchor member.

6. Brake friction means having anchorage means including a pair of thrust links pivoted to said first-mentioned means, in combination with brake return springs acting under compression on said links.

7. Brake friction means for engagement with a rotatable drum and having a shiftable anchorage including a pair of thrust links pivoted to the brake friction means, in combination with brake return springs acting under compression on said links and resisting movement thereof away from anchored position.

8. A brake comprising, in combination, a drum, a floating expansible band within the drum, apertured anchor members at opposite sides of the drum, links pivoted to opposite sides of the band and extending through said anchor members and having parts in anchoring thrust engagement with said anchor members, stops on the free ends of said links, and coil springs sleeved on the links and compressed between the stops and the anchor members.

9. A brake comprising, in combination, a drum, a floating expansible band within the drum, apertured anchor members at opposite sides of the drum, links pivoted to opposite sides of the band and extending through said anchor members and having parts adjustably mounted thereon and in anchoring thrust engagement with said anchor members, stops on the free ends of said links, and coil springs sleeved on the links and compressed between the stops and the anchor members.

LUDGER E. LA BRIE.